(12) United States Patent
Berbiguier et al.

(10) Patent No.: US 7,693,986 B2
(45) Date of Patent: Apr. 6, 2010

(54) TEST FLIGHT ON-BOARD PROCESSING SYSTEM AND METHOD

(75) Inventors: Michel Berbiguier, Colomiers (FR); Jean-Francois Dausse, Tournefeuille (FR)

(73) Assignee: Airbus France, Toulouse (FR)

( * ) Notice: Subject to any disclaimer, the term of this patent is extended or adjusted under 35 U.S.C. 154(b) by 316 days.

(21) Appl. No.: 11/813,675

(22) PCT Filed: Feb. 9, 2006

(86) PCT No.: PCT/FR2006/050110

§ 371 (c)(1),
(2), (4) Date: Jul. 11, 2007

(87) PCT Pub. No.: WO2006/085028

PCT Pub. Date: Aug. 17, 2006

(65) Prior Publication Data

US 2008/0140829 A1    Jun. 12, 2008

(30) Foreign Application Priority Data

Feb. 11, 2005    (FR) .................................. 05 50409

(51) Int. Cl.
*G06F 15/173* (2006.01)
*G06F 19/00* (2006.01)
(52) U.S. Cl. ........................................ 709/224; 701/14
(58) Field of Classification Search .................. 709/201, 709/224; 701/14, 24, 35
See application file for complete search history.

(56) References Cited

U.S. PATENT DOCUMENTS 7,428,210 B2 *   9/2008   Saika .......................... 370/217
2001/0008019 A1   7/2001   Vert et al.

FOREIGN PATENT DOCUMENTS

FR    2 843 209 A1    2/2004

OTHER PUBLICATIONS

F. Brajou, et al. The Airbus A380—an AFDX-based flight test computer concept, 2004 IEEE Autotestcon, XP010806579, Sep. 20, 2004, pp. 460-463.
M. Berbiguier, "Essais en Vol A380: Totem contrôle les paquets", Silogic Actualités, XP002343104, No. 25, Jun. 2004, pp. 1-2.
F. Brajou, et al. The Airbus A380 - an AFDX-based flight test computer concept, 2004 IEEE Autotestcon, XP010806579, Sep. 20, 2004, pp. 460-463.
M. Berbiguier, "Essais en Vol A380: TOTEM contrōle les paquets", Silogic Actualités, XP002343104, No. 25, Jun. 2004, pp. 1-2.

* cited by examiner

*Primary Examiner*—Yemane Mesfin
(74) *Attorney, Agent, or Firm*—Oblon, Spivak, McClelland, Maier & Neustadt, L.L.P.

(57) ABSTRACT

A system for onboard processing of flight tests, which includes a group of standard interchangeable computers connected to an Ethernet network identical software being installed on each computer.

11 Claims, 4 Drawing Sheets

TEST FLIGHT ON-BOARD PROCESSING SYSTEM AND METHOD

TECHNICAL DOMAIN

This invention relates to a system and method for on board processing of flight tests.

STATE OF PRIOR ART

Aircraft safety and aircraft maturity on entry into service depend on a flight test campaign extending over a 10 to 12-month period. During this campaign, these aircraft are instrumented with a large number of sensors and are provided with calculation means capable of carrying out and interpreting flight tests.

Important means are provided to test an aircraft before the first flight and during the flight test campaign, including general integration bench, flight simulator, structural strength and endurance tests, onboard installations, remote measurement means, ground measurement means, ground data processing systems, etc., for carrying out flight tests on new aircraft.

The onboard means have to be increasingly reliable, powerful and modulable.

Flight tests consist of studying the behaviour of the aircraft and its systems under very specific conditions. The set of tests confirms calculations made in the design office, or shows up anomalies for which adjustments are necessary. Interpretation of these tests demonstrates to civil aviation cercification authorities that the aircraft is in a condition such that it can receive the airworthiness certificate. The flight test engineer uses a predetermined program for this purpose that gives details of every step to be performed during a flight. The flight test engineer performs the following steps for each of these phases using data provided to him by the onboard test installation:
  assist aircraft pilots to set up the required conditions for a test,
  perform the test,
  maintain liaison with aircraft specialists who monitor the test in real time from the ground using remote measurement means,
  maintain safety conditions for the crew and for the aircraft.

All aircraft data are recorded during the flight, and are then interpreted on the ground by different specialist engineers.

The main functions of onboard systems on an aircraft are no:
  carry out tests; different screens include block diagrams or curves used to judge whether or not a test is valid,
  monitor one test installation,
  calculate the aircraft model on real time,
  store the generated data,
  dynamically create a remote measurement message.

Onboard installations are used to spy on one aircraft during test flights using specific means that do not interfere with the aircraft or its systems. They are composed of four levels:
  sensors (or takeoff points) and formatting of measurements, taken with the objective of deriving elementary parameters of the aircraft,
  processing of some information and then presentation to the flight test engineer so that he can perform the test,
  send specific information to the ground in real time so that remote measurement specialists can monitor the test,
  store ail collected or calculated information for use in making more detailed analyses on the ground after the flight.

Thus, more than six thousand measurement systems provide almost a hundred thousand items of information for each second of flight.

Flight test engineers need to display a large quantity of information from aircraft sensors, so that flight tests can be carried out on aircraft.

This function, that is essential for the test to be done properly, is performed by General purpose Onboard Computers that include all equipment, acquire measured data, process the data and display aircraft parameters to the flight test engineer during the flight, in real time. Systems according to prior art are adversely affected by their high sensitivity to hardware and software problems encountered on General purpose Onboard Computers, it single failure may make it necessary to stop the planned tests, with significant effects on costs.

The major problem with systems according to prior art is that they operate in computer centre environments incompatible with the use of onboard systems. Onboard systems are different from others in that they need to work in a completely independent mode; an engineer cannot take any action, to reconfigure the system if a problem arises. This is why the hardware architecture and software components are designed to be "Fault Tolerant". The only allowable human intervention is to switch she computers on and off.

The purpose of the invention is a hardware and software architecture capable of automatic reconfiguration in the case of a computer failure, to avoid the risk of losing a test following a hardware failure in the test control computers.

PRESENTATION OF THE INVENTION

The invention relates to an onboard flight test processing system, characterized in that it comprises a group of standard interchangeable computers connected to an Ethernet network, identical software being installed on each computer, and in that each computer comprises means of monitoring the other computers in the group so that partner computers and the tasks being done on each computer are known at all times, these monitoring means using a strategies file identical on each computer that exhaustively describes all information for all the computers, and that lists the tasks for each computer.

Advantageously, the software installed on each computer comprises the following modules:
  first "availability manager" means that manage applications as a function of elements input by other means,
  a static "strategies file" table that defines operation of each computer,
  second "group monitor" means no describe the composition of the group of computers at all times,
  third "application monitor" means that monitor the state of applications being executed on the system,
  fourth "context manager" means that manage the context of the computer.

Advantageously, the strategies file exhaustively describes all configurations of all computers in the group and each computer knows the list of tasks chat at is required to execute, and also the list of casks to be done by the other computers, at all times, due to the composition of the computer group. The strategies file comprises;
  a first part that describes applications blocks by associating a logical name with a list of executables that represents a service or a set of services to be provided,
  a second part that associates one name of an available function with each computer that might, belong to the group, a third part that relates an applications block to each function that the computers might perform.

The group monitor cyclically sends a message containing the name and address of the computer on which it is running. It performs two functions:
- it cyclically signals the presence of a computer on the network to the other computers,
- it continues listening to the network so as to set up and maintain the list of computers in the group.

The applications monitor cyclically examines the state of applications running on the computer and signals any anomalies to the availability manager. The context manager performs two functions:
- It writes an applications trace log that contains execution information and errors from each application, and strategy changes applied to changes in the group.
- It distributes application context files to other computers so that a task can be displaced from one computer to another when a change is made to the composition of the group of computers due to a strategy change. The availability manager starts, restarts or stops applications depending on the instructions in the strategies file and continuously updates the process situation table that an inter-task communication system can use to determine the address of each application.

Advantageously, each computer is a UNIX computer and uses LINUX input/output boxes for peripheral functions.

The invention also relates to an onboard test processing method using a processing system comprising a set of standard interchangeable computers connected to an Ethernet network, an identical software being installed on each computer, characterised in that the following steps are executed if there is a failure in one computer:
- detection of the anomaly by computers that are still in operation,
- automatic reconfiguration of the system as a function of a strategy determined in a strategies file, identical on each computer, that exhaustively describes all configurations in the group of computers, and in which tasks for each computer are listed,
- maintain functions essential for the test.

The system according to the invention is based on new elements in the onboard field:
- an architecture organised around an Ethernet network using interchangeable standard UNIX computers (computer bank) and Linux input/output boxes for peripheral functions,
- software elements that:
- perform shared monitoring of operation of the computers,
- form a reconfiguration device based on predefined strategies,
- take account of the computer function by an additional key,
- monitor applications,
- maintain and distribute the applications context,
- keep an up-to-date events and errors log for machines and applications,
- dynamically position the different functions.

All computers are configured identically and have the same influence in the group, and are therefore interchangeable. Each computer has the following characteristics:
- Four tasks run on each computer: the group monitor, the context manager, the applications monitor and the availability manager.
- The group is kept consistent through the strategies file that is identical on each machine.
- There is no dialogue between the computers other than sending a "heartbeat" signal.

DETAILED PRESENTATION OF PARTICULAR EMBODIMENTS

The onboard flight test processing system according to the invention integrates six functions on the same hardware platform:
- a test control function: display, supervision of flight tests, control of flight test equipment.
- an event detection function: equipment, parameters, storage.
- a pre-operation function: models (loads, performance, etc.), triggers, electrical network quality, derived parameters, etc.
- a wideband processing function: FFT (Fast Fourier Transform), comfort criteria, detection of peaks, statistics.
- a remote measurement function: generation of the remote measurement message.
- a switched Ethernet type redundant communication network supervision function called the "AFDX network", as described in document references [1] and [2] at the end of the description.

Figure 1:
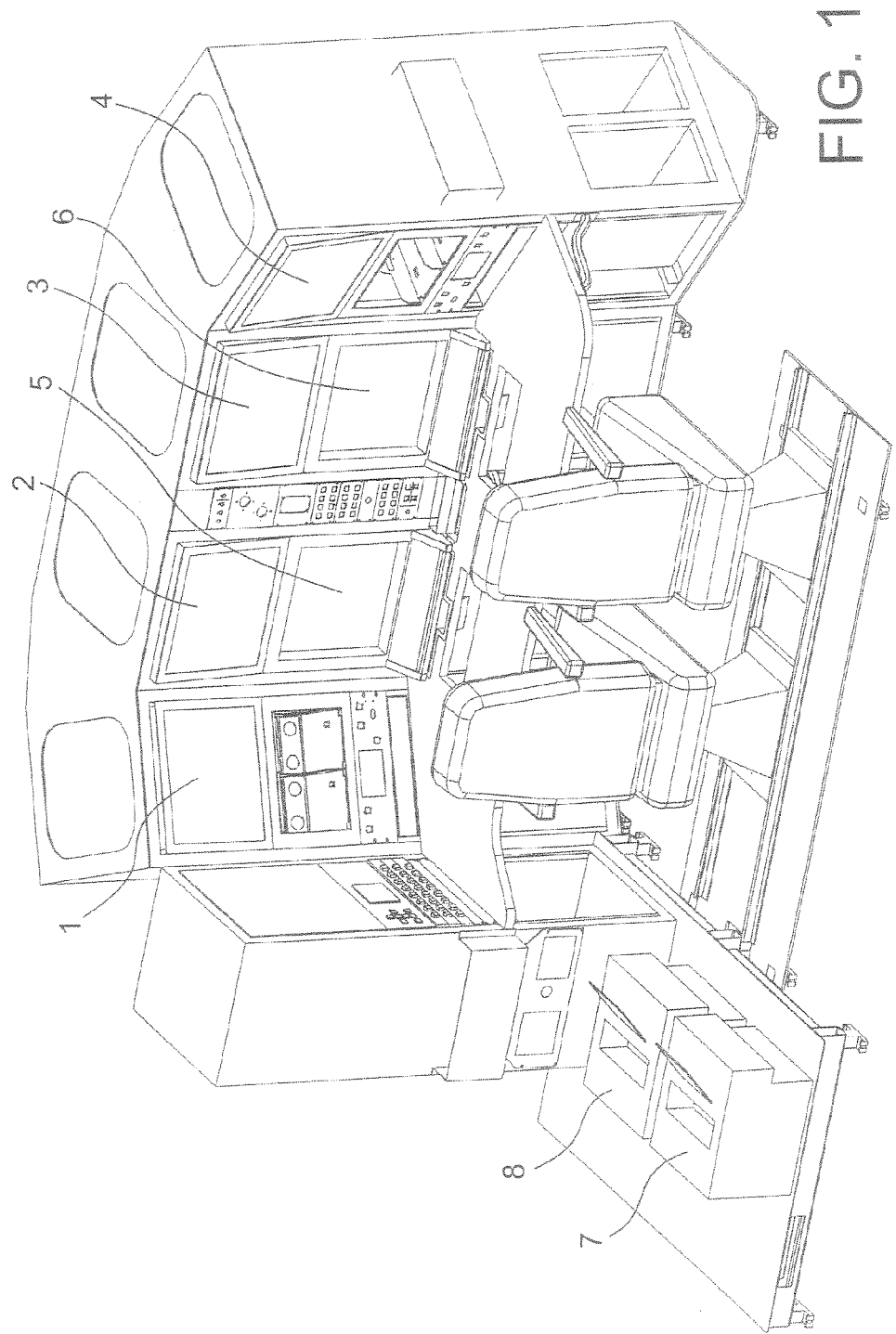
FIG. 1 illustrates the workstation of the flight test engineer using the system according to the invention.

The flight test engineer has a workstation like that shown in FIG. 1 to control such a system, comprising in particular:
- four screens in the upper part 1, 2, 3, 4
- two graphic plotters 5, 6
- two colour printers 7, 8.

The architecture of the switched flight test installation according to the invention is based on four data processing levels:
- a first sensor level,
- a second acquisition level,
- a third concentration level,
- a fourth recording and analysis level.

Each physical magnitude (pressure, temperature, force, etc.) is converted into a measurable electrical magnitude (voltage or current) in the first level. Some systems at this level can include some second level functions such as filtering, analogue-digital conversion, etc.

Second level systems handle analogue, digital, discrete acquisition. In particular, these systems perform the following tasks:
- for digital inputs: sensor control, analogue filtering, data sampling and analogue-digital conversion, limited mathematical functions, etc.,
- for digital inputs: sorting of labels, filtering,
- for all inputs: marking of the time as a function of the global synchronisation, formatting of data into packets, sorting of packets to their destinations (fourth level groups).

The third level is the level at which data streams from all second level systems towards fourth level systems are collected. Data are not modified in any way as they pass through this third level. The only functions are switches and duplications of incident frames, done by standard Ethernet switches.

Fourth level systems are onboard systems that subscribe to the flow of aircraft parameters, such as:
- mass data storage for subsequent analysis on the ground,
- pre-processing by onboard test processing units and display for flight test engineers,
- remote measurement.

A flight test database containing the configuration of each system is used for managing all systems in the flight test installation. This database describes the variation of each aircraft parameter from the very beginning of its life (physical phenomenon) until its storage in packets.

Figure 2:
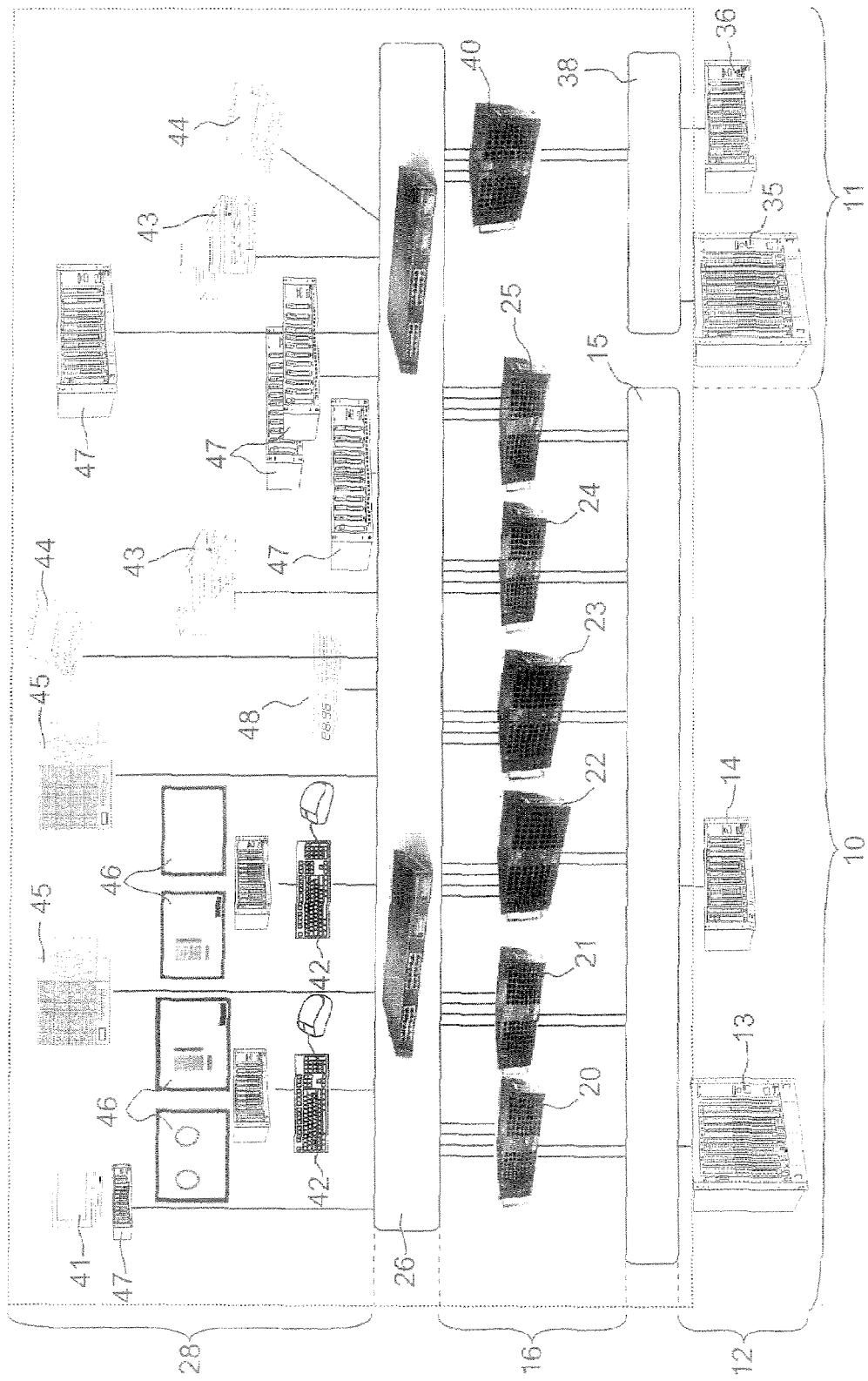
FIG. 2 illustrates the architecture of the system according to the invention.

As shown in FIG. 2, the switched flight test installation according to the invention comprises:
- a basic system 10,
- a wideband system 11, The basic system 10 comprises:
- at the first level not shown in the figure:
  - the measurement of parameters,
  - the arrival of a "full duplex" bus,
- at the second level 12:
  - AFDX units 13, and standard units 14,
  - at the third level:
  - switching units 15,
- at the fourth level 16:
  - several processing units 20 to 25 corresponding to:
  - test control units 20 and 21,
  - pre-operation units 22 and 23,
  - a remote measurement unit 24,
  - an AFDX network supervision unit (25)
    - an Ethernet switching unit 26,
    - recording and analysis units 28 available to the flight test engineer that may for example consist of screens 41, keyboards and mouse devices 42, printers 43, portable computers 44, graphic plotters 45, screen copies 46, input/output boxes 47, a unit 48 designed to make aircraft computer queries and to change parameters of these computers.

The wideband system 11 comprises:
- at the first level not shown in the figure:
  - measurement of wideband parameters,
- at the second level:
  - AFDX units 35 and standard units 36,
- at the third level:
  - a switching unit 38,
- at the fourth level:
  - a processing unit 40.
  - an Ethernet switching unit already mentioned 26.

The general architecture of the system comprises a set of elementary computers 50 in which each elementary computer cooperates to provide a service and also to improve availability, A software set provides availability functions.

An identical software set is defined on each of these computers, so as to facilitate upgrading the set. Consequently, all computers play equivalent roles at all times. In other words, no one computer is considered to be a master or main server. There is no limitation to the number in this set of computers.

In order to overcome seizure by a master server and dialogues issuing orders, each computer 50 is provided with the means of knowing which partners it has and the tasks being executed by each, at all times. This knowledge is obtained by heartbeat messages sent by each computer, and is used to set up and maintain the list of computers present. This list is the entry point to determine the tasks to be accommodated on each computer. This information is available in the file describing strategies to be adopted for each computer as a function of the composition of the group.

As shown in FIG. 2, the architecture of the software set on the elementary computers 50 connected to an Ethernet network 51 comprises the following for each given computer:
- a first module 52 called the "availability manager" that manages applications as a function of elements provided by the other modules,
- a static table 53 called the "strategies file", that defines operation of each computer 50,
- a second module 54, called the "group monitor", to describe the composition of all computers 50 at all times,
- a third module 55 called the "applications monitor" that supervises all applications 56 currently being executed on the system,
- a fourth module 57 called the "context manager" that manages the context of the given computer 50.

The following describes each of these modules 52, 54, 55 and 57, and the static table 53 for a given computer 50.

The Strategies File

The strategies file 53 exhaustively describes all configurations in all computers; it contains a list of the tasks that each computer must execute in each case. Consequently, each computer knows the list of tasks that it must execute, and also the list of tasks to be accommodated by the other computers in the group, at all times, by reference to the composition of the group.

This computer operation table 53 describes application groups, computers and strategies to be applied, in turn. This table 53 is identical on all computers in the group. Each computer uses it to determine:
- the function that it has to perform,
- applications that it has to host and monitor,
- the situation of other computers.

The strategies file 53 defines three aspects of the system configuration.

The first part describes applications blocks, associating a list of executables that represents a service or a set of services to be provided, with a logical name. Several names may be defined in this manner. When creating these lists, it is important to be sure that the same task cannot be located in several applications blocks that could be executed simultaneously on one or several computers. Executables are known by the name of their run program. The order in which they appear in the list determines the order in which each task is started. The name of application start programs is followed by a field that determines the mode in which the program will be run. At least two different modes can be given, namely a "Waiting" mode and an "Unmonitored" mode. Waiting mode is applicable for tasks for which it is necessary to wait for these tasks to be finished before starting subsequent tasks in the list. This mode makes chaining possible that would not be possible with normal on-the-fly mode. This may involve a task that configures an element before other tasks use it. This mode guarantees sequential running.

A second part associates the name of an available function with each computer that might belong to the group. The number of these functions is at least equal to the maximum possible number of computers used in the group. Each computer performs a unique role in the group at every moment. One of these functions may be to not execute any application during nominal operation and be ready to replace a defective computer to provide full redundancy. In most cases, these functions correspond to the services to be provided by these computers, plus all functions corresponding to the different acceptable degraded modes.

A third part links an applications block with each function that the computers can perform. This part exhaustively defines all possible combinations between the different computers. For each combination, each computer used in the combination will be assigned an applications block.

Therefore, a particular strategies file 53 can be installed on several aircraft with an identical installation. It can also be used for replacing computers 50 after hardware failures without needing to adapt the strategies file. The latter option is only possible when the replacement is made using another computer capable of performing the same function, which in particular means that configurations of peripherals must be strictly identical.

The Group Monitor

The group monitor 54 cyclically emits a heartbeat for the system, and listens to heartbeats from other computers to create the group composition list and to keep it up-to-date.

The group monitor 54 performs two functions:

It cyclically signals the presence of a computer 50 on the network to the other computers.

It continues listening to the network so as to set up and maintain the list of computers in the group.

The group monitor 54 periodically sends a message containing the name and IP ("Internet Protocol") address of the computer on which it is running. This message is sent in broadcast mode on the network 51 to inform all other members. The choice of a "multicast" communication makes it possible to give an identification to the group. Thus, several groups of computers can be created on the same network.

A configuration file is associated with the group monitor. This file contains data including the "multicast" address of the group and time variables that adjust the intervals at which heartbeat messages are sent. This configuration file must be identical on each member in a particular group of computers.

The second function of the group monitor 54 is to continue listening to heartbeats from the other computers 50. Using messages that in receives, it creates a list of computers that it sends to the availability manager 52. It then maintains this list, in other words it adds or deletes computers 50 as a function of received messages. When there is a change in the group, the group monitor 54 sends the new list to the availability manager 52. A computer 50 is deleted from the list if it has not sent a heartbeat during several consecutive periods. This number of periods is one of the parameters contained in the configuration file.

The group monitor 54 is informed through its communication channel with the availability manager 52 as soon as the availability manager disappears. If this happens, the group monitor 54 stops sending its heartbeats because the disappearance of the availability manager 52 implies that the applications have also disappeared, or at least they are not all in an operational state.

The group monitor 54 manages consistency of the group. The system uses it to determine the composition of the group of computers at any time, including its members but also the applications stored on its members. This information is deduced from the composition of the set of computers and the strategies file 53. Since the strategies files on all computers 50 are identical, the consistency of the system depends on the confidence that can be given to the list of computers.

The Applications Monitor

The applications monitor 55 cyclically examines the state of applications running on the computer 50 and notifies any anomalies to the availability manager.

The applications monitor 55 periodically verifies that applications are active.

When starting, the applications monitor 55 reads the configuration file so as to accept the time parameters concerning it. This file is the same as the file that contains the parameters for the group monitor 54.

The applications monitor 55 receives the applications list that the availability manager 52 has run. This list contains the names of applications and their identifiers.

It queries each application cyclically to check its activity. If one of these applications disappears or is functioning abnormally, it informs the availability manager. Its role is limited to monitoring applications and informing the availability manager 52 so that the availability manager can handle failures.

If the case arises, the applications monitor 55 is informed about the disappearance of the availability manager 52 through its communication channel. In this case, there is no longer any point in monitoring, because it cannot by itself make any decision or take any action.

The Context Manager

The context manager 57 performs two functions:

it writes an application trace log containing information about execution and errors in each application, and changes in strategies applied to the change to the composition of the group. The resulting file is used for precise monitoring of the life of the system.

it distributes application context files to other computers 50 in the group so that, if necessary, a task can be moved from one computer 50 to another when a change is made to the composition of the group of computers due to the strategy change.

The context manager 57 is a utility that performs two services. Firstly it organises the computer trace file, and secondly it acts as a local and remote writer of application restart files.

When starting, the context manager 57 makes a dated backup of the trace file before opening it for the current session. The purpose is to keep the history of the system each time it is started.

The context manager 57 sets up a mailbox to which each application sends its information, trace or error messages, so as to provide an easy-to-use diagnostic tool. The context manager empties this mailbox and organises the messages in a single file. The fact that there is only one file makes chronological monitoring of events easy, facilitating detection of any interactions between applications.

A set of tools is used to interpret this file by extraction of an application, a severity, a time zone, etc.

A range of functions is provided that applications use to write their messages. These functions are grouped in a library and mask the installed mechanisms. Programmers use them like normal program calls.

Some applications change context while they are being executed. If applications stop and restart, either on the host computer or on an elementary computer, it is important not to lose this context and not to restart in the initial phase. The concept of a restart file solves this problem so that the restart can be made in the context that was in place before the stop.

Applications can create a restart file by using a set of functions contained in a library. A task that wants to use this means posts a message with its restart data in a mailbox managed by the context manager. The context manager regularly empties the mailbox, writes data into the applications restart file and sends it to the other computers in the group.

The Availability Manager

The availability manager 52 starts, restarts or stops applications in accordance with instructions in the strategies file 53 and keeps the process situation table up-to-date so that an inter-task communication system can use it to know the address of each application. It is also always in waiting for a new software version to be installed.

The availability manager 52 is at the centre of the software set. It combines a large number of functions:
- load the strategies file,
- recovery and use of information sent by the group monitor 54,
- determine the strategy to be applied and start applications,
- notify the list of running applications to the applications monitor,
- stop, start or restart applications according to strategies or application incidents,
- management of a process information table, that can be read by applications,
- detection and installation of a new set of software.

At the time of initialisation, the availability manager 52 reads the configuration file to recover the parameters that it needs.

The availability manager 52 checks that the environmental variables necessary to start applications are actually set. If not, an error is sent and the availability manager stops.

The availability manager 52 loads the strategies file 53 into memory, so that it will be able to react correctly. Whenever it is active, the availability manager reads this table to make the necessary decisions following notifications by the group monitor or to update the table containing information about application processes.

The availability manager continues listening to its communication channel with the group monitor 54. As soon as it receives a group modification notice, it reads the strategies file 53 and determines the applications block that it needs to set up.

It compares the list of applications that it needs to run with the list of active applications and uses this comparison to deduce the series of actions to be carried out.

The availability manager 52 also listens to its communications channel with the applications monitor, When notified by the applications monitor, it stops and restarts the application that it was notified as being defective. This operation cannot continue indefinitely. After a given number of restarts defined by a parameter in the configuration file, the availability manager 52 declares the application to be invalid, this stopping it definitively.

The stop procedure can be activated for all active tasks before the availability manager is stopped or during the procedure to install a new software set.

It is also possible to stop and restart all applications for debugging or ground maintenance purposes.

The main function of the process information table is to notify each application about the addresses of other tasks so that they can communicate.

This table contains firstly a lock that prevents it from being read whenever the availability manager 52 is inputting data to it. The second general type of information is the number of tasks running on the global system.

Other indications relate to each process running on all of the computers 50. The availability manager 52 fills in this table every time that there is a change of strategy. The availability manager 52 uses its knowledge about the composition of the group and the strategies table, to determine the host computer for a given task.

For each process, the table indicates the task identifier, the name of the computer on which it is active, the IP ("Internet Protocol") address of this computer, characteristics of the task and the task valid/invalid indication indicating any systematically defective tasks.

The availability manager 52 periodically checks to see if a new software set should be installed. There is a procedure by which a portable computer deposits the new software set on the computers. The software set is deposited in a specific directory in the form of several compressed archived files.

If these files are detected, all applications will be stopped. The availability manager decompresses the different files, copies them, moves them and dearchives them. After these operations, the availability manager 52 reads the strategies file 53 again and restarts the applications.

Figure 3:
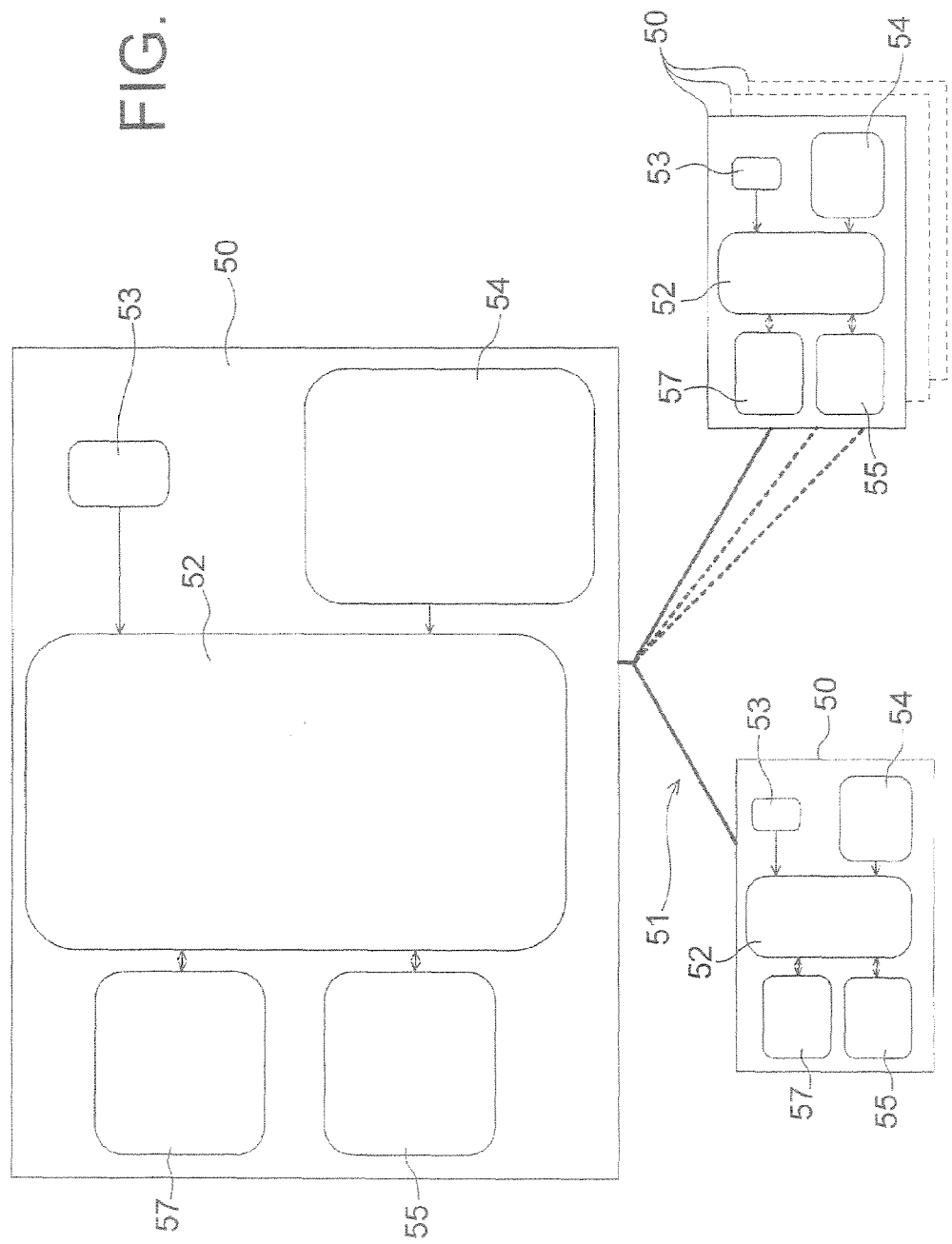
FIG. 3 illustrates the architecture of the set of software installed on elementary computers in the system according to the invention.
Figure 4A:
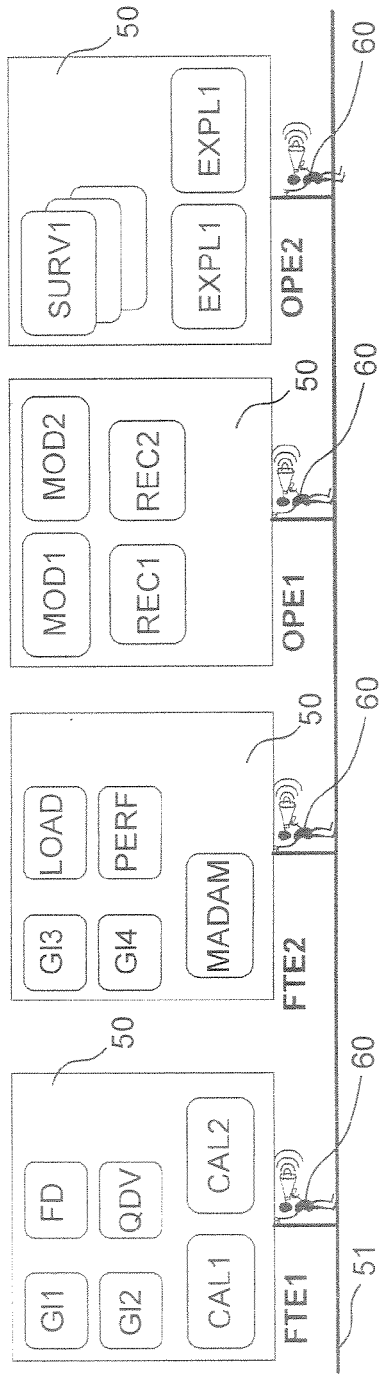
FIGS. 4A and 4B illustrate an example of how tolerance to failures according to the invention functions.
Figure 4B:
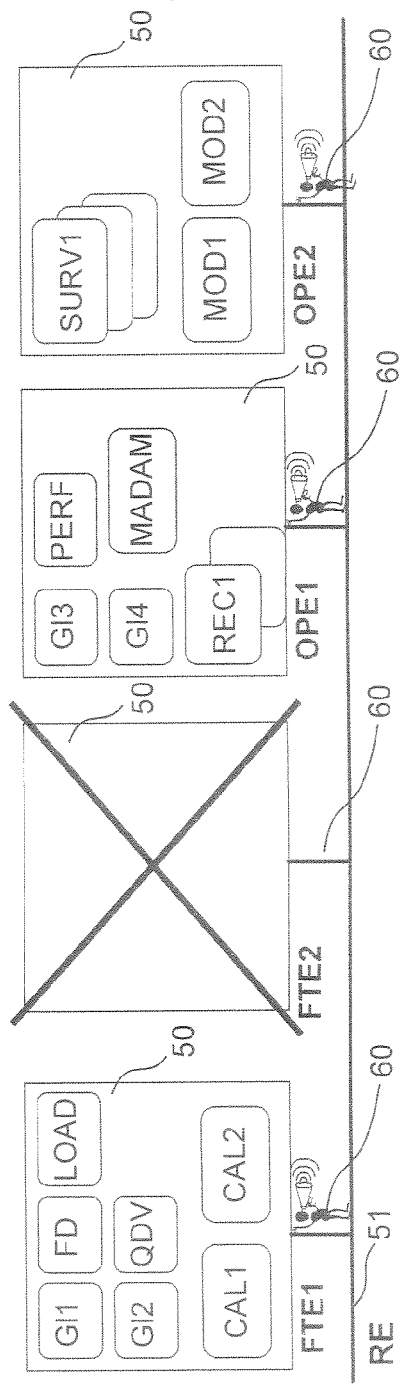

The system according to the invention as shown in FIG. 3 can reconfigure itself automatically if there is a computer failure. FIGS. 4A and 4B illustrate an example of this type of operation. In FIG. 4A, four computers 50 (functions FTE1, FTE2, OPE1, OPE2) are connected to the Ethernet network 51 and communicate with each other (see person reference 60). Each performs several tasks. The strategy adopted for all computers 50 is good. In FIG. 4B, strategy FTE2 adopted on the second computer is bad. The tasks that were previously being performed in this function FTE2 have been redistributed to the other computers 50.

REFERENCES

[1] "An AFDX-based flight test system" by Herve Gachette, Philippe Rico and Francois-Henri Worm (Creative Electronic Systems, May 2004.)

[2] "AIM to provide common standard AFDX databus analysers for the Airbus A 380" (press review of the AIM company, Oct. 17, 2003).

The invention claimed is:

1. An on-board flight test processing system, comprising:
a group of standard interchangeable computers connected to an Ethernet network, identical software being installed on each computer;
a plurality of integrated flight test functions, in the flight test processing system, to monitor and log events associated with a flight test, and
each computer comprises a monitoring unit configured to monitor other computers in the group so that partner computers and tasks being done on each computer are known at all times, the monitoring unit using a strategies file, identical on each computer, that exhaustively describes all information for all computers, and that lists the tasks for each computer, wherein the software installed on each computer includes:
an availability manager unit configured to manage a plurality of flight test applications as a function of inputted elements,
a static strategies file table, that defines operations of each computer,
a second group monitor unit configured to describe a composition of the group of computers at all times,
an application monitor unit configured to monitor a state of applications being executed on the system, and
a context manager unit configured to manage a context of the computer on which they are installed.

2. The system according to claim 1, wherein the strategies file exhaustively describes all configurations of all computers in the group, and each computer knows the list of tasks that it is required to execute, and also the list of tasks to be executed by the other computers, at all times, due to the composition of the computer group.

3. The system according to claim 2, wherein the strategies file comprises:
- a first part that describes applications blocks by associating a logical name with a list of executables that represents a service or a set of services to be provided,
- a second part that associates a name of an available function with each computer that might belong to the group, and
- a third part that relates an applications block to each function that the computers might perform.

4. The system according to claim 1, wherein the group monitor cyclically sends a message containing a name and address of the computer on which it is running.

5. The system according to claim 4, wherein the group monitor performs functions of:
- cyclically signalling a presence of a computer on the network to the other computers, and
- continuing listening to the network so as to set up and maintain the list of computers in the group.

6. The system according to claim 1, wherein the applications monitor examines the state of applications running on the computer and signals any anomalies to the availability manager unit.

7. The system according to claim 1, wherein the context manager performs functions of:
- writing an applications trace log that contains execution information and errors from each application, and strategy changes applied to changes in the group, and
- distributing application context files to other computers so that a task can be displaced from one computer to another when a change is made to the composition of the group of computers due to a strategy change.

8. The system according to claim 1, wherein the availability manager unit starts, restarts, or stops applications depending on instructions in the strategies file and continuously updates a process situation table that an inter-task communication system can use to determine an address of each application.

9. The system according to claim 1, wherein each computer is a UNIX computer.

10. The system according to claim 9, further comprising LINUX input/output boxes for peripheral functions.

11. An on-board flight test processing method using a processing system including a set of standard interchangeable computers connected to an Ethernet network, an identical software being installed on each computer, the method comprising:
- executing, a plurality of flight test functions in the processing system, to monitor and log events associated with a flight test;
- detecting, if there is a failure in one computer, an anomaly by computers that are still in operation;
- automatically reconfiguring the system as a function of a strategy determined in a strategies file, identical on each computer, that exhaustively describes all configurations in a group of computers, and in which tasks for each computer are listed;
- maintaining functions essential for the test;
- managing, in an availability manager unit, a plurality of flight test applications as a function of inputted elements;
- defining operations of each computer in a static strategies file table;
- monitoring, in a group monitor unit, a composition of the group of computers at all times;
- monitoring, in a second monitor unit, a state of applications being executed on the system; and
- managing, in a context manager unit, a context of the computer on which they are installed.

* * * * *